US012346127B2

(12) United States Patent
Tschanz et al.

(10) Patent No.: US 12,346,127 B2
(45) Date of Patent: Jul. 1, 2025

(54) SIMULATING AN OPERATION OF A CONTROL SYSTEM OF A RIDE SYSTEM BASED ON STOCHASTIC EVENTS

(71) Applicant: Disney Enterprises, Inc., Burbank, CA (US)

(72) Inventors: Michael Tschanz, Orlando, FL (US); Jose Corpuz, Ocoee, FL (US); Michael S. Welch, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 384 days.

(21) Appl. No.: 18/145,850

(22) Filed: Dec. 22, 2022

(65) Prior Publication Data
US 2024/0210948 A1    Jun. 27, 2024

(51) Int. Cl.
| | |
|---|---|
| *G05D 1/00* | (2024.01) |
| *G05B 17/00* | (2006.01) |
| *G05B 17/02* | (2006.01) |
| *A63G 7/00* | (2006.01) |

(52) U.S. Cl.
CPC ........... *G05D 1/0297* (2013.01); *G05B 17/02* (2013.01); *A63G 7/00* (2013.01)

(58) Field of Classification Search
CPC ......... G05D 1/0297; G05B 17/02; A63G 7/00
USPC .......................................................... 701/24
See application file for complete search history.

(56) References Cited

U.S. PATENT DOCUMENTS

| | | | | |
|---|---|---|---|---|
| 4,838,384 | A | * | 6/1989 | Thangavelu .......... B66B 1/2458 187/385 |
| 2020/0289950 | A1 | * | 9/2020 | Krauthamer ........... A63G 31/16 |

* cited by examiner

*Primary Examiner* — Tiffany P Young
(74) *Attorney, Agent, or Firm* — Foley & Lardner LLP

(57) ABSTRACT

In some implementations, a ride control simulation system may receive a request to simulate a ride control system controlling a movement of a passenger vehicle on a ride system, wherein the request includes vehicle information regarding the passenger vehicle and ride system information regarding the ride system. The ride control simulation system may execute, based on the request, a computer model to simulate the ride control system controlling the movement of the passenger vehicle on the ride system. Executing the computer model comprises randomly selecting values from one or more data distributions. The computer model is executed using the first value, the second value, and the third value as inputs. The ride control simulation system may cause an adjustment to an operation of the ride system based on a result of executing the computer model.

20 Claims, 10 Drawing Sheets

SIMULATING AN OPERATION OF A CONTROL SYSTEM OF A RIDE SYSTEM BASED ON STOCHASTIC EVENTS

BACKGROUND

A ride system includes a passenger vehicle that transports passengers through a ride experience. Typically, the passenger vehicle includes a system or device that propels the passenger vehicle through the ride experience, from one portion of the ride system to another portion of the ride system. A control system, of the ride system, may be used to control a movement of the passenger vehicle. In some situations, the control system may be tested by simulating an operation of the control system.

SUMMARY

In some implementations, a method performed by a ride control simulation system includes receiving a request to simulate a ride control system controlling a movement of a passenger vehicle on a ride system, wherein the request includes vehicle information regarding the passenger vehicle and ride system information regarding the ride system; executing, based on the request, a computer model to simulate the ride control system controlling the movement of the passenger vehicle on the ride system, wherein executing the computer model comprises: randomly selecting a first value from a first data distribution regarding times associated with loading passengers onto passenger vehicles, causing an adjustment to an operation of the ride system based on a result of executing the computer model.

In some implementations, a system includes a ride control system configured to control a movement of a passenger vehicle on a ride system; and a ride control simulation system configured to: receive a request to simulate the ride control system controlling the movement of the passenger vehicle on the ride system, wherein the request includes vehicle information regarding the passenger vehicle and ride system information regarding the ride system; executing, based on the request, a computer model to simulate the ride control system controlling the movement of the passenger vehicle on the ride system, wherein, to execute the computer model, the ride control simulation system is configured to: randomly select one or more values from a plurality of data distributions, wherein the one or more values are randomly selected to simulate one or more stochastic events occurring between a stopping time of the passenger vehicle and a dispatch time of the passenger vehicle, and wherein the computer model is executed using the one or more values as one or more inputs; and cause an adjustment to an operation of the ride system based on a result of executing the computer model.

In some implementations, a non-transitory computer-readable medium storing a set of instructions includes one or more instructions that, when executed by one or more processors of a device, cause the device to: receive a request to simulate a ride control system controlling a movement of a passenger vehicle on a ride system, wherein the request includes vehicle information regarding the passenger vehicle and ride system information regarding a ride system; executing, based on the request, a computer model to simulate a ride control system controlling the movement of the passenger vehicle on the ride system, wherein the one or more instructions, that cause the device to execute the computer model, cause the device to: randomly select one or more values from a plurality of data distributions, wherein the one or more values are randomly selected to simulate one or more stochastic events occurring between a stopping time of the passenger vehicle and a dispatch time of the passenger vehicle, and wherein the computer model is executed using the one or more values as one or more inputs; and perform an action based on a result of executing the computer model.

DETAILED DESCRIPTION

Figure 1A:
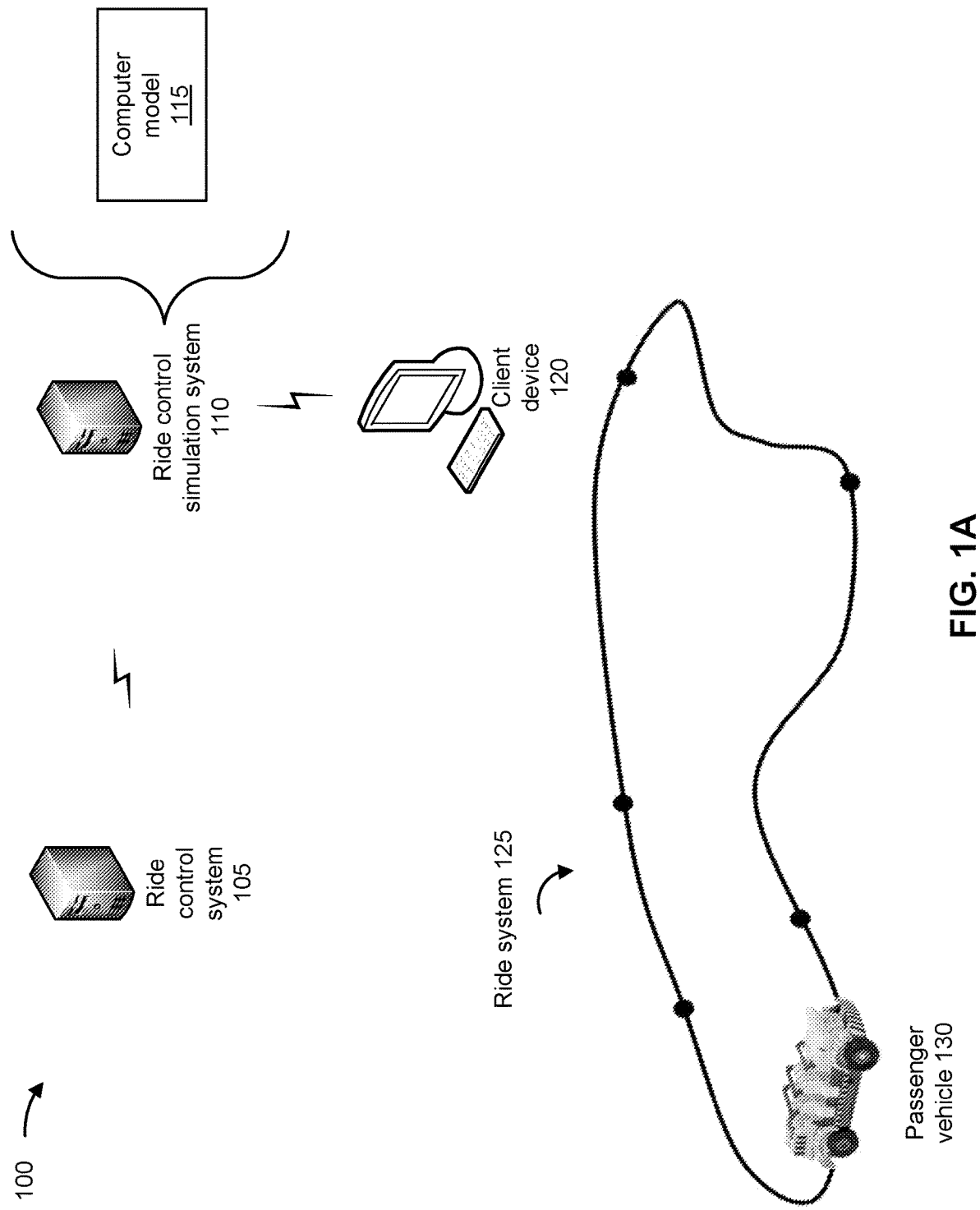
FIGS. 1A-1G are diagrams of an example implementation described herein.

The following detailed description of example implementations refers to the accompanying drawings. The same reference numbers in different drawings may identify the same or similar elements.

A control system of a ride system may be tested using a computer simulation. The computer simulation may be used to test (or evaluate) complex components of the control system. For example, the computer simulation may simulate operations of the components of the control system. As part of the computer simulation, a computer model (that models an operation of the ride system) may be executed by a computer, inputs may be provided to the computer model, and outputs may be generated based on executing the computer model using the inputs.

The computer model of the control system may be a physics-based model. The inputs may include information regarding the control system and/or regarding the ride system. The outputs may include information regarding passengers transported using passenger vehicles of the ride system and/or regarding a manner in which the passenger vehicles operate.

Currently, the computer simulation may simulate mechanical and electrical systems that typically behave in a predictable manner. However, the computer simulation does not account for a wide range of variable and unpredictable conditions that the control system may be subject to. For example, the computer simulation does not account for variability and unpredictability surrounding human interactions from guests (e.g., passengers of a passenger vehicle), human interactions from operators, weather conditions, and/or environmental conditions, among other examples. In other words, the computer simulation does not account for stochastic events.

Empirical data confirms that passengers do not load into a passenger vehicle in a single uniform time. Similarly, empirical data confirms that operators do not perform safety checks in a single uniform time and/or do not cause passenger vehicles to be dispatched in a single uniform time.

Simulating the wide range of variable and unpredictable conditions during the computer simulation is a difficult task. Accordingly, one solution has been to utilize averaged or otherwise summarized data values as an input for operator or passenger behavior (e.g., an average of passenger load times for loading passengers into a passenger vehicle, an average of safety check times for performing safety check to ensure passengers are safe, and/or an average of passenger vehicle dispatch times for dispatching passenger vehicles, among other examples).

Another solution has been to utilize worst case times (e.g., maximum passenger load times, maximum safety check times, and/or maximum vehicle dispatch times, among other examples). Yet another solution has been to not account for passenger behavior or operator behavior. Notwithstanding the foregoing, the above solutions do not address variable passenger load times (including multiple consecutive long passenger load times), variable safety check times, variable passenger vehicle dispatch times, among other examples.

Basing the computer simulation on average times and/or worst case times produces inaccurate results. For example, basing the computer simulation on average times and/or worst case times may cause the computer simulation to generate, as an output, inaccurate information regarding passengers transported using the passenger vehicles and/or inaccurate information regarding the manner in which the passenger vehicles operate.

In some situations, actions may be taken regarding the operation of the ride system based on the output. Because the output is inaccurate, any such actions will negatively affect the operation of the ride system.

Implementations described herein are directed to a simulation environment that accounts for random or naturally distributed events that affect inputs to a computer model that models a behavior of a control system of a ride system (e.g., that models the operation of the control system of the ride system). The computer model may be a physics-based model configured to handle physics-based events and interactions. Additionally, the computer model may be configured to emulate stochastic events, such as variability and unpredictability of passengers and operators interacting with the ride system.

Instead of using average, minimum, or maximum values for each stochastic event, implementations described herein are directed to utilizing times (e.g., passenger load times, safety check times, and/or dispatch times) that vary across a data distribution. For example, one or more values may be randomly selected from a plurality of data distributions. The one or more values may be randomly selected to simulate one or more stochastic events occurring between a stopping time of the passenger vehicle and a dispatch time of the passenger vehicle. The "stopping time" may refer to a time at which the passenger vehicle comes to a full stop after arriving at a loading/unloading station. The "dispatch time" may refer to a time at which an operator dispatches the passenger vehicle from the loading/unloading station.

The one or more values may include a first value randomly selected from a first data distribution regarding times associated with loading passengers onto passenger vehicles, a second value randomly selected from a second data distribution regarding times associated with performing safety checks for the passengers, a third value randomly selected from a third data distribution regarding times associated with dispatching the passengers after the safety checks, among other examples.

In some implementations, the computer model may simulate an event being detected by the ride control system. Detecting the event may include determining that the passenger vehicle is not in motion at the loading/unloading station and determining that the passenger vehicle is ready for passengers to be loaded after determining that the passenger vehicle is not in motion. The one or more values may be randomly selected, from the plurality of data distributions, based on the event being detected.

In some situations, a data distribution may vary based on one or more factors. For example, the data distribution may vary based on a period of time, may vary based on a geographical area associated with the ride system, may vary based on a weather condition, may vary based on a type of the ride system, and/or may vary based on a quantity of passengers, among other examples. For example, values for the data distribution during a first period of time may be different than values of the data distribution during a second period of time.

In some implementations, the data distribution may include historical data regarding an operation of the ride system. In some situations, the data distribution may be a normal data distribution (e.g., a log normal data distribution). Alternatively, the data distribution may be a non-normal data distribution.

By randomly selecting values from different data distributions as described, implementations may simulate one or more stochastic events that may occur between the stopping time of the passenger vehicle and the dispatch time of the passenger vehicle. Based on the foregoing, a passenger may be modeled based on a variability with respect to passenger load times.

Additionally, or alternatively, operator may affect a variability of the passenger load time based on an amount of interaction the ride operator and the passenger. In this regard, values for a passenger load time, a safety check time, and/or a dispatch time may be randomly selected and provided as inputs to the computer model to model the stochastic events discussed herein.

By modeling the stochastic events (e.g., non-physics-based events) as described herein, outputs of the computer simulation may be more accurate. The outputs may include an average number of guests (or passengers) transported per passenger vehicle, an average hourly operating capacity (throughput) for the ride system, and/or an average dispatch time between passenger vehicles of the ride system, among other examples. Additionally, by modeling the stochastic events, the computer model may simulate a wider variety of operating conditions for the control system and/or the ride system.

Based on the outputs of the computer simulation, actions may be performed to improve an operation of the ride system and/or improve an operation of the control system. For example, based on the outputs, a ride control simulation system may adjust stopping times, add additional stopping times, adjust dispatch times, adjust a quantity of passenger vehicles provide on the ride system, adjust a quantity of components of the ride system, adjust a geometry of the ride system, among other examples. The actions may improve guest experience of guests (e.g., passengers) using the ride system.

Implementations described herein are also directed to a batch of computer simulations of the operation of the control system. The batch may include hundreds and/or thousands of computer simulations. For each computer simulation, one or more values may be randomly selected from one or more data distributions and the one or more randomly selected values may be provided as inputs to the computer model. In this regard, the batch may vary the stochastic events across a range or ranges decided by a modeler of the computer model. The batch may be used to automatically generate computer simulation runs that test norms and extremes of the stochastics events and the impact of the stochastic events on the ride system as a whole.

FIGS. 1A-1G are diagrams of an example implementation 100 associated with simulating an operation of a control system of a ride system based on stochastic events. As shown in FIGS. 1A-1G, example implementation 100 includes a ride system controller 105 of a ride system 125, a ride control simulation system 110, a client device 120, and a passenger vehicle 130.

Ride control system 105 may include one or more devices configured to control an operation of ride system 125. For example, ride control system 105 may be configured to control a movement of passenger vehicle 130 and movements of one or more additional passenger vehicles. For instance, ride control system 105 may be configured to cause passenger vehicle 130 to be in motion (e.g., in one or more directions), cause passenger vehicle 130 to be stationary, increase a velocity of passenger vehicle 130, decrease the velocity, among other examples.

Additionally, or alternatively to controlling passenger vehicles, ride control system 105 may be configured to control operations of other components of ride system 125. For example, ride control system 105 may control an operation of braking equipment provided along the ride path, and/or control orientations of one or more portions of the ride path, among other examples. In some implementations, ride control system 105 may include a programmable logic controller. In some situations, the programmable logic controller may be referred to as a wayside ride control system (WRCS).

Ride control simulation system 110 may include one or more devices configured to execute computer model 115 to simulate an operation of ride system controller 105 and/or simulate an operation of ride system 125. Computer model 115 may include a computer model that is configured to simulate an operation of ride system controller 105 and/or of an operation of ride system 125. Computer model 115 may be a physics-based computer model that is configured to simulate the operation of ride system 125. For example, computer model 115 may include a physics engine that is configured to simulate movements of the one or more passenger vehicles of ride system 125 (e.g., a movement of passenger vehicle 130).

Additionally, or alternatively to being a physics-based model, computer model 115 may be configured to simulate stochastic events that may occur during the operation of ride system controller 105 and/or during the operation of ride system 125. For example, computer model 115 may be configured to simulate stochastic events relating to variability of human interactions with ride system 125, as explained herein. For instance, during execution of computer model 115, one or more values may be randomly selected from one or more data distributions associated with the human interactions. The one or more values may be provided to computer model 115 as inputs to simulate the stochastic events.

Computer model 115 may generate, as an output, an average number of guests (or passengers) transported per passenger vehicle, an average hourly operating capacity (throughput) for the ride system, and/or an average dispatch time between passenger vehicles of the ride system, among other examples.

Client device 120 may include one or more devices configured to receive (e.g., from ride control simulation system 110) outputs of computer simulations and provide the outputs for display (e.g., to an operator of ride system 125, to a modeler of computer model 115, among other examples). In some implementations, client device 120 may include computer model 115 and may be configured to execute computer model 115 in a manner similar to a manner in which ride control simulation system 110 executes computer model 115.

A computing capability of ride control simulation system 110 may exceed the computing capability of client device 120. Accordingly, ride control simulation system 110 may be configured to provide more inputs to computer model 115 than a quantity of inputs provided by inputs to computer model 115, ride control simulation system 110 may be configured to randomly selected more values than values randomly selected by client device 120, and/or ride control simulation system 110 may be configured to perform more computer simulations in a batch than a quantity of computer simulations performed in a batch by client device 120.

In some situations, ride control simulation system 110 may perform a first portion of a computer simulation and client device 120 may perform a second portion of the computer simulation. For example, client device 120 may randomly select values as inputs to computer model 115 and may provide the values to ride control simulation system 110 to cause ride control simulation system 110 execute computer model 115 using the inputs.

Passenger vehicle 130 may include a vehicle that is configured to transport one or more passengers along a ride path of a ride system 125. In some implementations, passenger vehicle 130 may include a trackless vehicle in an amusement park, an autonomous vehicle, and/or an automated guided vehicle (AGVs), among other examples of vehicles.

Figure 1B:
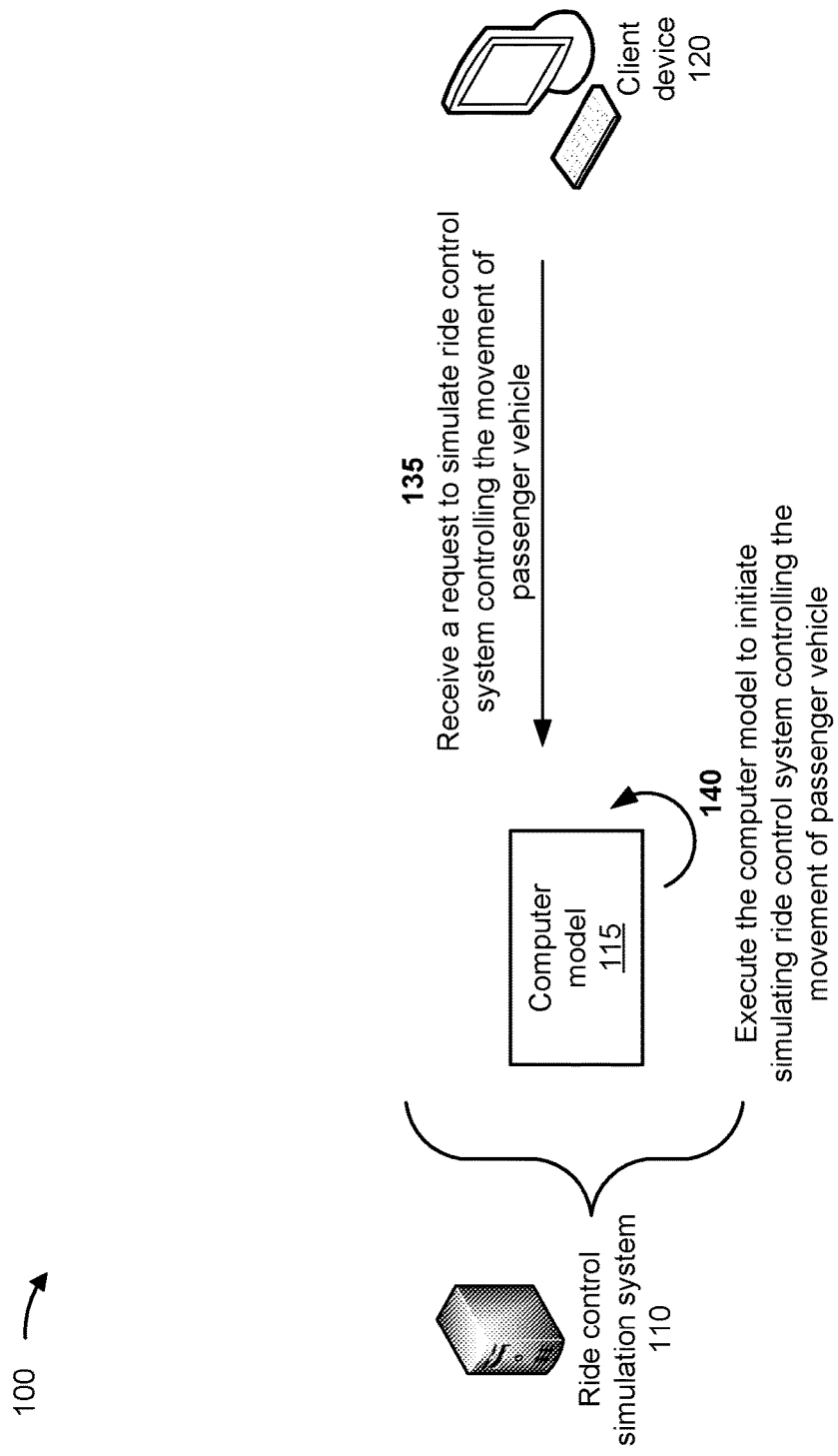

As shown in FIG. 1B, and by reference number 135, ride control simulation system 110 may receive a request to simulate ride system controller 105 controlling the movement of passenger vehicle 130. The request may be received from client device 120. In some examples, the request may include vehicle information regarding passenger vehicle 130 and ride system information regarding ride system 125. Alternatively, ride control simulation system 110 may be pre-configured with the vehicle information and/or the ride system information. For example, the vehicle information and/or the ride system information may be stored in a memory of ride control simulation system 110 prior to ride control simulation system 110 receiving the request. The vehicle information may identify a mass of passenger vehicle 130 (when passenger vehicle 130 is not transporting passengers), a weight of the passenger vehicle (when passenger vehicle 130 is not transporting passengers), and/or a size of the passenger vehicle (e.g., a length and/or a width of the passenger vehicle), among other examples.

The ride system information may include information regarding ride system controller 105, a geometry of a ride path of ride system 125, information regarding braking equipment provided along the ride path (e.g., an amount of friction that may be applied to wheels of passenger vehicle 130), information regarding one or more lifts provided along the ride path, information regarding one or more additional passenger vehicles of ride system 125, information identifying a quantity of passenger vehicles of ride system 125, orientations of one or more portions of the ride path (e.g., regarding orientations of one or more tracks), among other examples.

As shown in FIG. 1B, and by reference number 140, ride control simulation system 110 may execute computer model 115 to initiate simulating ride system controller 105 controlling the movement of passenger vehicle 130. For example, ride control simulation system 110 may execute computer model 115 using the vehicle information and/or the ride system information.

Figure 1C:
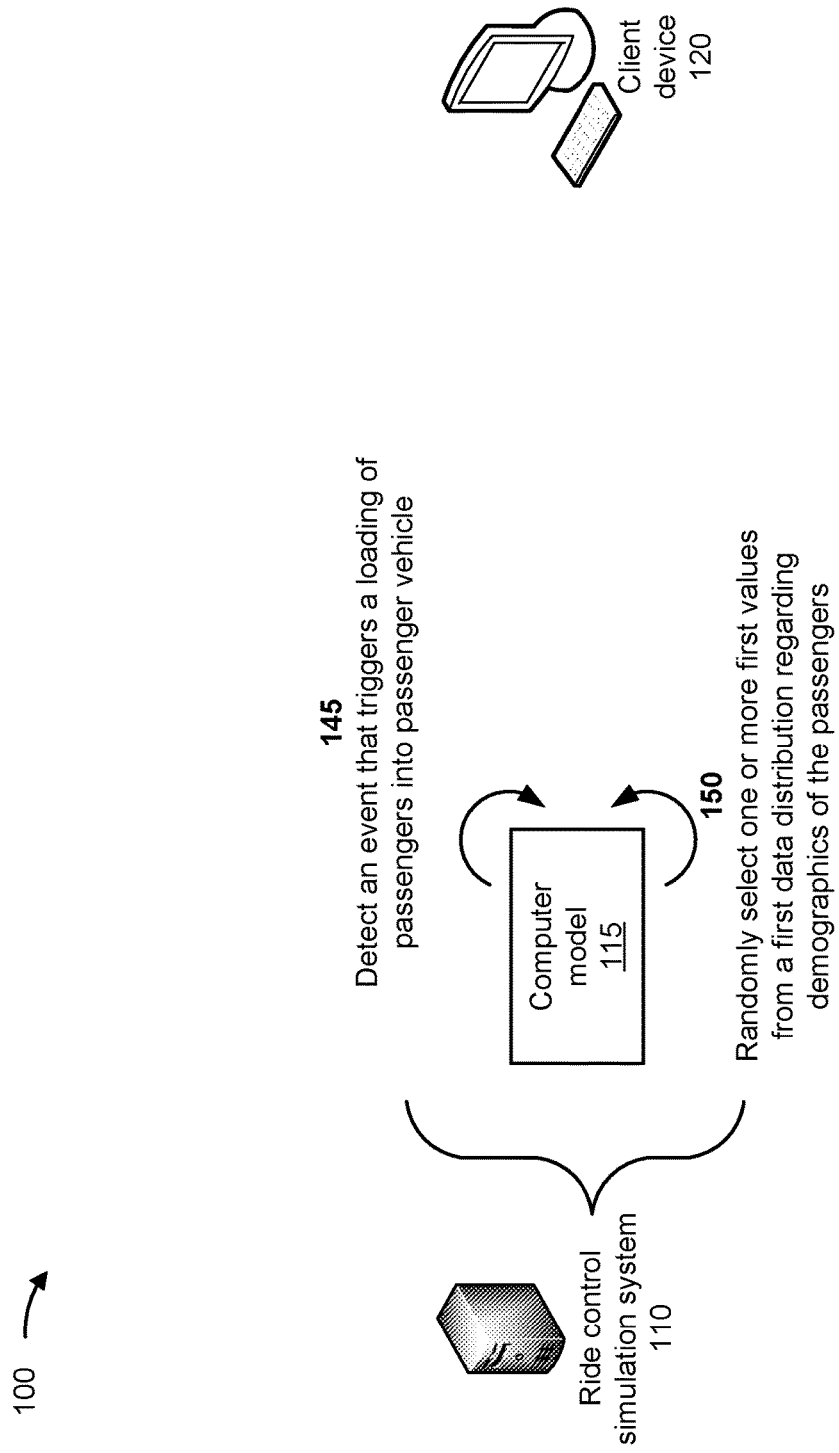

As shown in FIG. 1C, and by reference number 145, ride control simulation system 110 may detect an event that triggers a loading of passengers into passenger vehicle 130.

For example, as part of simulating the operation of ride system controller 105, computer model 115 may simulate ride system controller 105 detecting the event. For instance, computer model 115 may simulate ride system controller 105 determining that passenger vehicle 130 is located in a loading/unloading station of ride system 125 and determining that passenger vehicle 130 is not in motion.

Based on determining passenger vehicle 130 is not in motion, computer model 115 may determine that passenger vehicle 130 is ready for passengers to be loaded into passenger vehicle 130. Accordingly, computer model 115 may determine that values are to be randomly selected from one or more data distributions in order to simulate stochastics events that may occur during the operation of ride system controller 105. In some instances, the one or more data distributions may be identified in the request. In some situations, different data distributions may be identified in different requests.

As shown in FIG. 1C, and by reference number 150, ride control simulation system 110 may select one or more first values from a first data distribution regarding demographics of the passengers. For example, based on determining that passenger vehicle 130 is ready for passengers to be loaded, ride control simulation system 110 (e.g., via computer model 115) may select the one or more first values from the first data distribution regarding demographics of the passengers. The first data distribution may include entries identifying different ages and different genders. For example, the first data distribution may include a first entry identifying a first age and a first gender, a second entry identifying a second age and the first gender, a third entry identifying a third age and a second gender, and so on.

In some instances, each entry may include probability information identifying a probability (or likelihood) associated with an age and a gender identified by the entry. For example, the first entry may indicate a first probability that passengers, of ride system 125, are of the first age and of the first gender; the second entry may indicate a second probability that passengers, of ride system 125, are of the second age and of the first gender; and so on.

The one or more first values may be randomly selected from the first data distribution using a pseudorandom number generator. In some instances, the numbers generated by the pseudorandom number generator may correspond to the probabilities identified in the first data structure. For example, the pseudorandom number generator may generate a first number and the first number may be used as an index to an entry in the first data distribution. For instance, the first number may identify the probability (or likelihood) associated with the first entry and, accordingly, the first age and the first gender may be selected.

In some instances, a quantity of the one or more first values may be determined based on a number of passengers to be loaded into passenger vehicle 130. The number of passengers may be determined using an initial data distribution of different quantity of passengers loaded into passenger vehicle 130. As an example, the initial data distribution may include a first entry identifying a first quantity of passengers, a second entry identifying a second quantity of passengers, and so on.

In some instances, each entry may include probability information identifying a probability (or likelihood) associated with the quantity of passengers identified by the entry. For example, the first entry may indicate a first probability that passengers loaded into passenger vehicle 130 are the first quantity of passengers, the second entry may indicate a second probability that passengers loaded into passenger vehicle 130 are the second quantity of passengers, and so on.

The number of passengers may be randomly selected from the initial data distribution using a pseudorandom number generator as described above. For example, the pseudorandom number generator may generate a number that is used as an index to an entry in the initial data distribution.

Figure 1D:
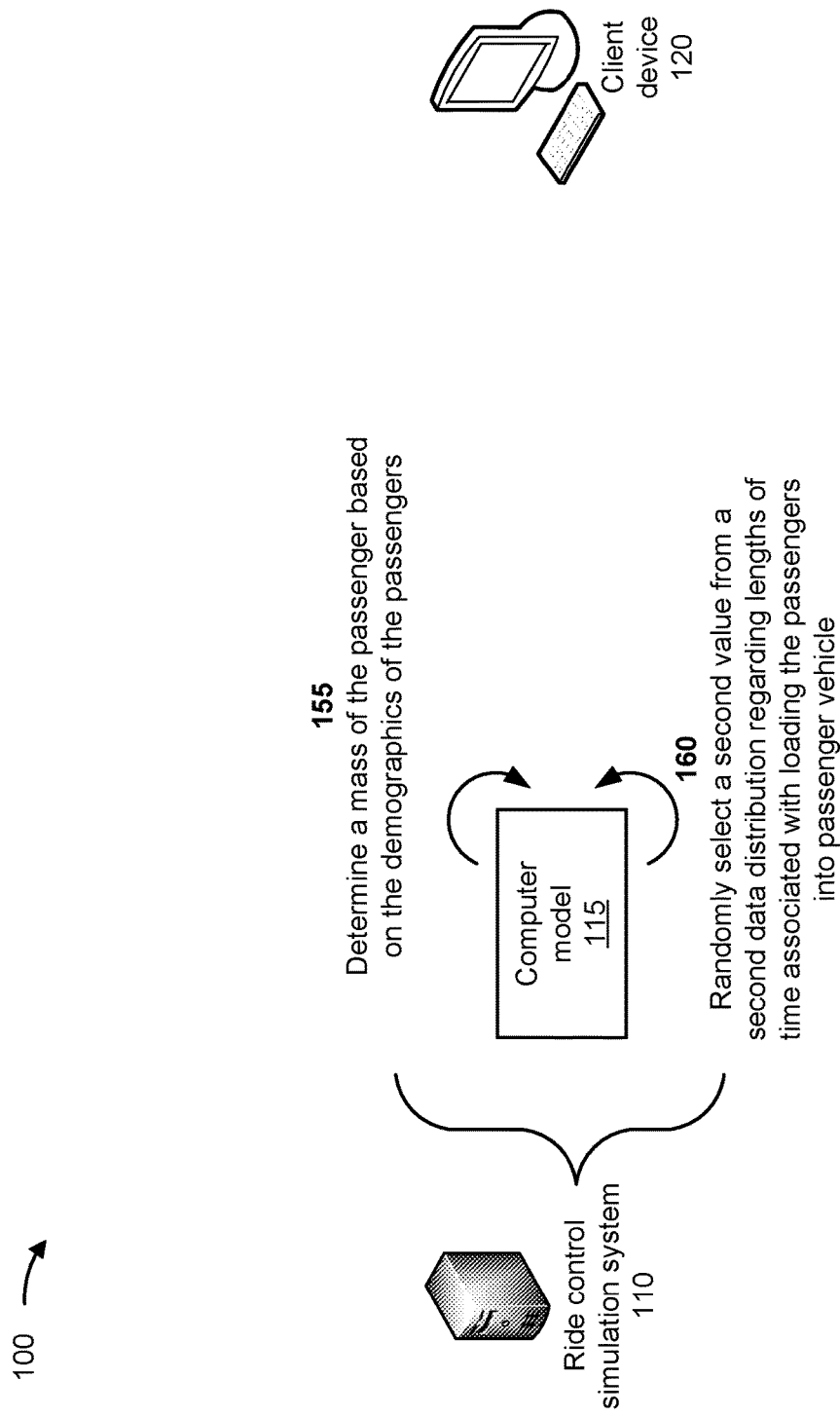

As shown in FIG. 1D, and by reference number 155, ride control simulation system 110 may determine a mass of the passengers based on the demographics of the passengers. For example, ride control simulation system 110 may determine a mass (e.g., a weight) of each passenger, of the passengers, based on demographics of the passenger. For instance, ride control simulation system 110 may determine a mass of each passenger based on an age and a gender of the passenger. In some instances, ride control simulation system 110 may determine the mass using a data structure that stores different weights in association with different ages and genders.

Ride control simulation system 110 may determine a total mass of the passengers. Based on the total mass of the passengers, ride control simulation system 110 may determine a loaded mass of passenger vehicle 130 that indicates a mass of passenger vehicle 130 when the passengers are loaded into passenger vehicle 130.

As shown in FIG. 1D, and by reference number 160, ride control simulation system 110 may randomly select a second value from a second data distribution regarding lengths of time associated with loading the passengers into passenger vehicle 130. For example, based on determining that passenger vehicle 130 is ready for passengers to be loaded, ride control simulation system 110 (e.g., via computer model 115) may select the second value from the second data distribution regarding the lengths of time associated with loading the passengers into passenger vehicle 130. The lengths of time associated with loading the passengers may be referred to as passenger load times.

The second data distribution may include entries identifying different passenger load times. For example, the second data distribution may include a first entry identifying a passenger load time, a second entry identifying a second passenger load time, a third entry identifying a third passenger load time, and so on.

In some instances, each entry may include probability information identifying a probability (or likelihood) associated with a passenger load time identified by the entry. For example, the first entry may indicate a first probability that a passenger load time is the first passenger load time, the second entry may indicate a second probability that a passenger load time is the second passenger load time, and so on. The second value may be randomly selected from the second data distribution using a pseudorandom number generator in a manner similar to the manner described in connection with the first data distribution.

Figure 1E:
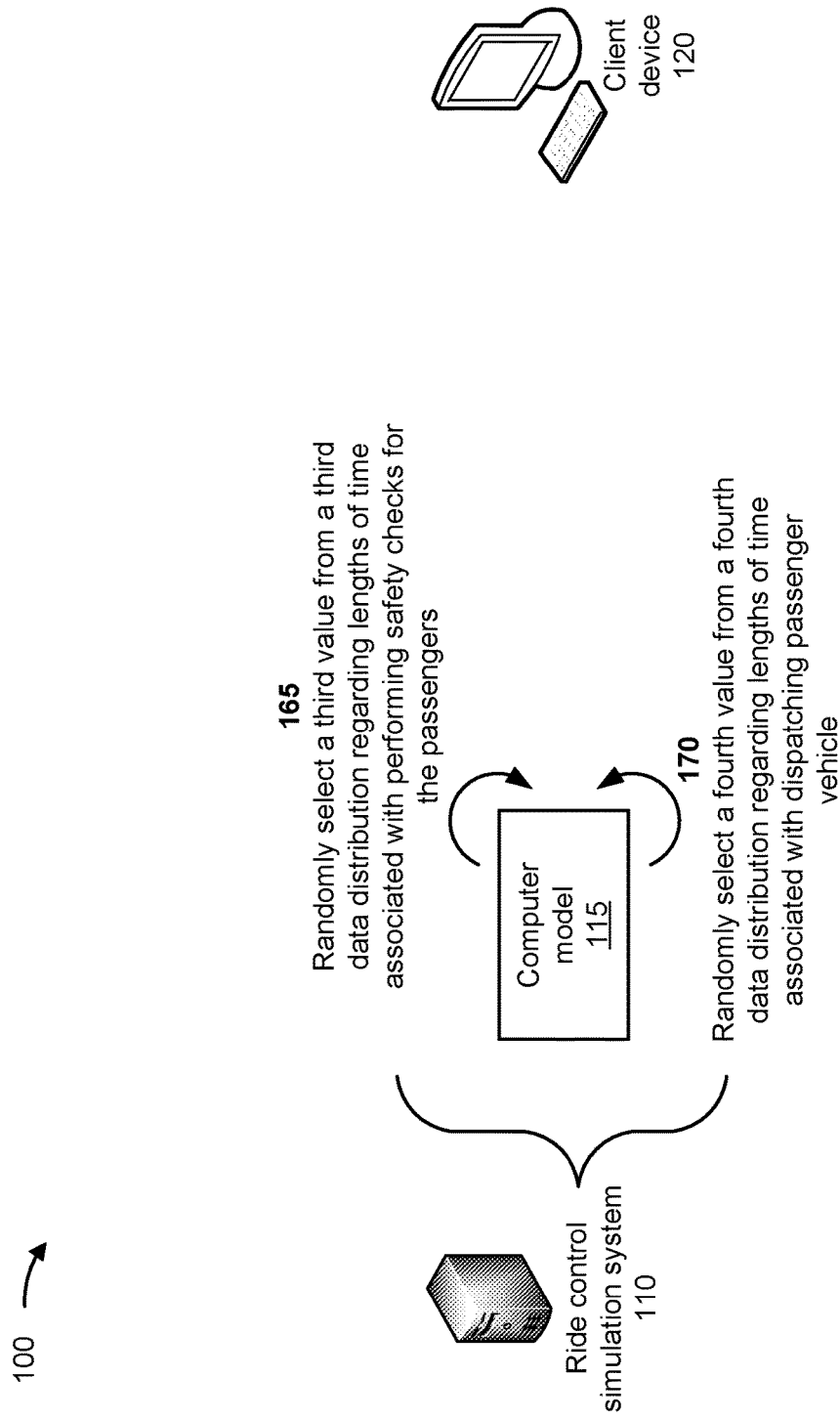

In some instances, instead of the second value being randomly selected from the second data distribution, one or more values may be randomly selected from data distributions related to the second data distribution. The data distributions may include data distribution of times to put on a seat restraint, a data distribution of times to put on a should restraint, a data distribution of times to put a lap restraint, a data distribution of times to walk to a seat of passenger vehicle 130, among other examples. Values may be randomly selected, in a similar manner, from data distributions related to the other data distributions described herein As shown in FIG. 1E, and by reference number 165, ride control simulation system 110 may randomly select a third value from a third distribution regarding lengths of time associated with performing safety checks for the passengers. For example, based on determining that passenger vehicle 130 is ready for passengers to be loaded, ride control simulation system 110 (e.g., via computer model 115) may select the third value from the third data distribution regarding the lengths of time associated with performing safety checks for the passengers.

The lengths of time associated with performing safety checks for the passengers may be referred to as safety check times. In some situations, a safety check time may further include an amount for an operator, of ride system 125, to return to an operator station after performing a safety check.

The third data distribution may include entries identifying different safety check times. For example, the third data distribution may include a first entry identifying a first safety check time, a second entry identifying a second safety check time, a third entry identifying a third safety check time, and so on.

In some instances, each entry may include probability information identifying a probability (or likelihood) associated with a safety check time identified by the entry. For example, the first entry may indicate a first probability that a safety check time is the first safety check time, the second entry may indicate a second probability that a safety check time is the second safety check time, and so on. The third value may be randomly selected from the third data distribution using a pseudorandom number generator in a manner similar to the manner described in connection with the first data distribution.

As shown in FIG. 1E, and by reference number 170, ride control simulation system 110 may randomly select a fourth value from a fourth distribution regarding lengths of time associated with dispatching passenger vehicles. For example, based on determining that passenger vehicle 130 is ready for passengers to be loaded, ride control simulation system 110 (e.g., via computer model 115) may select the fourth value from the fourth data distribution regarding the lengths of time associated with dispatching passenger vehicles. The lengths of time associated with dispatching passenger vehicles may be referred to as dispatch times.

The fourth data distribution may include entries identifying different dispatch times. For example, the fourth data distribution may include a first entry identifying a first dispatch time, a second entry identifying a second dispatch time, a third entry identifying a third dispatch time, and so on.

In some instances, each entry may include probability information identifying a probability (or likelihood) associated with a dispatch time identified by the entry. For example, the first entry may indicate a first probability for the first dispatch time, the second entry may indicate a second probability for the second dispatch time, and so on. The fourth value may be randomly selected from the fourth data distribution using a pseudorandom number generator in a manner similar to the manner described in connection with the first data distribution.

Figure 1F:
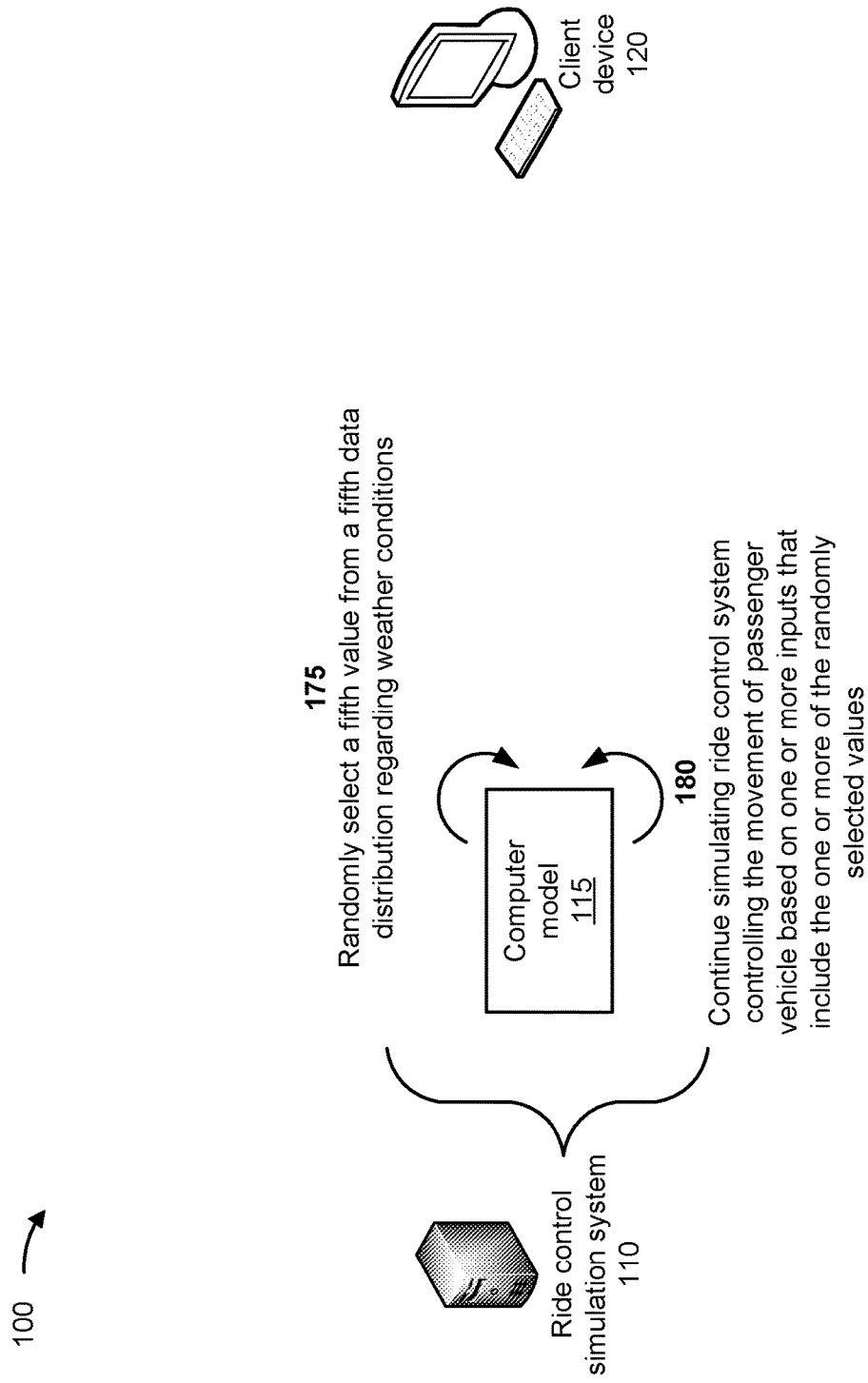

As shown in FIG. 1F, and by reference number 175, ride control simulation system 110 may randomly select a fifth value from a fifth distribution regarding weather conditions. For example, based on determining that passenger vehicle 130 is ready for passengers to be loaded, ride control simulation system 110 (e.g., via computer model 115) may select the fifth value from the fifth data distribution regarding the weather conditions.

The fifth data distribution may include entries identifying different weather conditions. For example, the fifth data distribution may include a first entry identifying a first weather condition (e.g., rain), a second entry identifying a second weather condition (e.g., snow), a third entry identifying a third weather condition (e.g., windy), and so on.

In some instances, each entry may include probability information identifying a probability (or likelihood) associated with a weather condition identified by the entry. For example, the first entry may indicate a first probability for the first weather condition, the second entry may indicate a second probability for the second weather condition, and so on. The fifth value may be randomly selected from the fifth data distribution using a pseudorandom number generator in a manner similar to the manner described in connection with the first data distribution.

As shown in FIG. 1F, and by reference number 180, ride control simulation system 110 may continue simulating ride control system 105 controlling the movement of passenger vehicle based on one or more inputs that include one or more of the values randomly selected. For example, one or more of the values randomly selected may be provided as one or more additional inputs to computer model 115. In some examples, the one or more additional inputs may introduce unpredictable delays that may occur during the operation of ride system controller 105. The one or more additional inputs may introduce unpredictable delays with respect passenger load times, with respect to safety check times, and/or with respect to dispatch times.

Additionally, or alternatively to introducing unpredictable delays, the one or more additional inputs may introduce unpredictable weather conditions, may introduce unpredictable quantities of passengers, and/or may introduce unpredictable mass for passenger vehicle 130, among other examples. For instance, one or more types of weather conditions may cause delays with respect to dispatching passenger vehicle 130.

Computer model 115 may simulate ride system controller 105 dispatching passenger vehicle 130 and may simulate passenger vehicle 130 returning to the loading/unloading station. Computer model 115 may randomly select the one or more values from the plurality of data structures as described herein after passenger vehicle 130 returns to the loading/unloading station. Computer model 115 may simulate ride system controller 105 dispatching passenger vehicle 130 based on unpredictable delays associated with the one or more values.

In some situations, computer model 115 may perform multiple iterations of randomly selecting one or more values and dispatching passenger vehicle 130. In some implementations, computer model 115 may perform the multiple iterations by way of a batch of computer simulations of the operation of ride system controller 105. The batch may include hundreds and/or thousands of computer simulations. For each computer simulation, one or more values may be randomly selected from one or more data distributions and the one or more randomly selected values may be provided as inputs to the computer model. The one or more randomly selected values of one computer simulation may be different than one or more randomly selected values of one computer simulation.

Based on performing the multiple iterations, computer model 115 may generate an output. In some examples, the output may include an average number of guests (or passengers) transported per passenger vehicle, an average hourly operating capacity (throughput) for the ride system, and/or an average dispatch time between passenger vehicles of the ride system, among other examples.

Figure 1G:
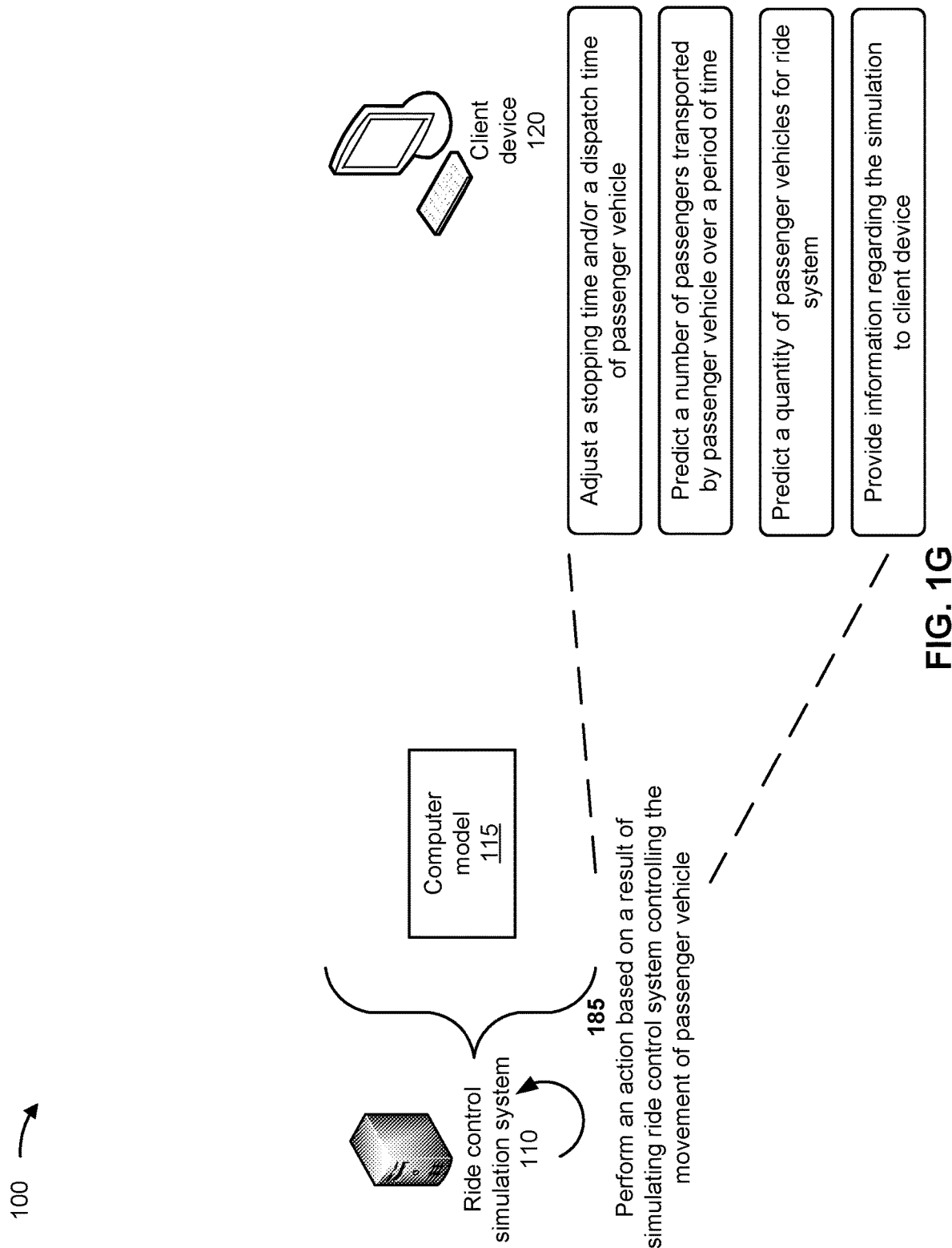

As shown in FIG. 1G, and by reference number 185, ride control simulation system 110 may perform an action based on a result of simulating ride system controller 105 controlling the movement of passenger vehicle 130. For example, ride control simulation system 110 may perform the action based on the output generated by computer model 115. In some implementations, ride control simulation system 110 may adjust a stopping time and/or a dispatch time of passenger vehicle 130 based on the output. Additionally, or alternatively, ride control simulation system 110 may predict a number of passengers that may be transported by passenger vehicle 130 over a period of time. Additionally, or alternatively, ride control simulation system 110 may predict a quantity of passenger vehicles to be included in ride system 125. Additionally, or alternatively, ride control simulation system 110 may provide information regarding the simulation to client device 120.

By modeling the stochastic events as described herein, outputs of the computer simulation may be more accurate. The outputs may include an average number of guests (or passengers) transported per passenger vehicle, an average hourly operating capacity (throughput) for the ride system, and/or an average dispatch time between passenger vehicles of the ride system, among other examples. Additionally, by modeling the stochastic events, the computer model may simulate a wider variety of operating conditions for the control system and/or the ride system.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
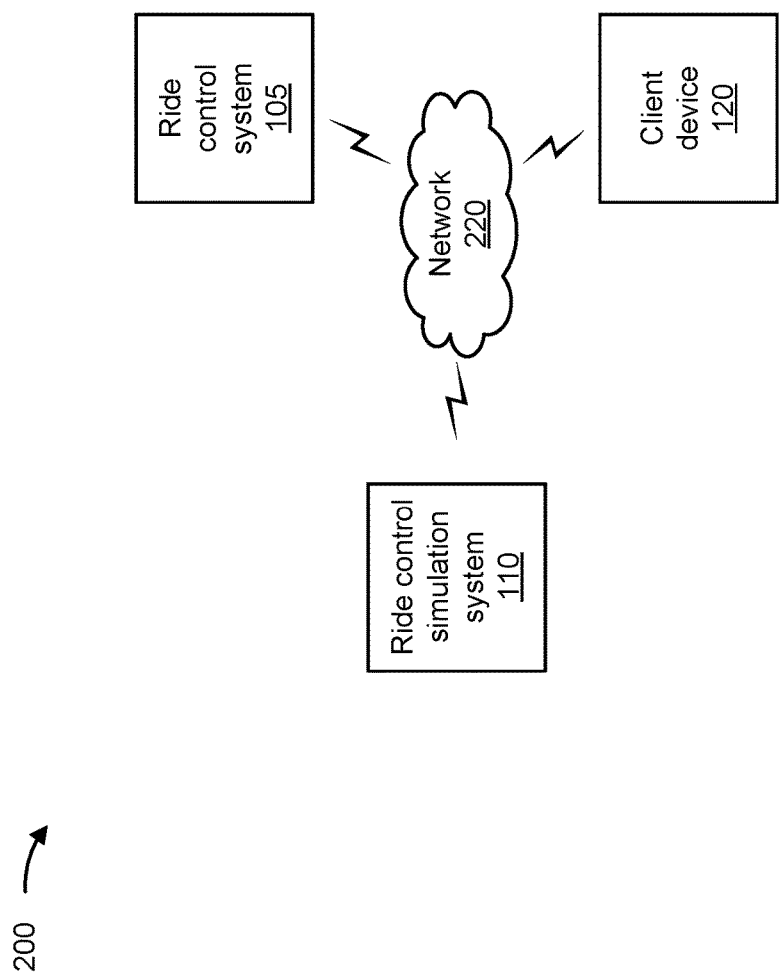
FIG. 2 is a diagram of an example environment in which systems and/or methods described herein may be implemented.

FIG. 2 is a diagram of an example environment 200 in which systems and/or methods described herein may be implemented. Some elements of environment 200 have been described above in connection with FIG. 1. In some implementations, ride control simulation system 110 may include one or more elements of and/or may execute within a cloud computing system. As further shown in FIG. 2, environment 200 may include ride control system 105, client device 120, passenger vehicle 130, and/or a network 220. Devices and/or elements of environment 200 may interconnect via wired connections and/or wireless connections.

In some situations, ride control simulation system 110 may include a server, such as an application server, a client server, a web server, a database server, a host server, a proxy server, a virtual server (e.g., executing on computing hardware), or a server in a cloud computing system. In some implementations, ride control simulation system 110 includes computing hardware used in a cloud computing environment.

Client device 120 includes one or more devices capable of receiving, generating, storing, processing, and/or providing information associated with simulating stochastics events during an operation of ride control system 105, as described elsewhere herein. Client device 120 may include a communication device and a computing device. For example, client device 120 may include a wireless communication device, a mobile phone, a user equipment, a laptop computer, a tablet computer, a desktop computer, or a similar type of device.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
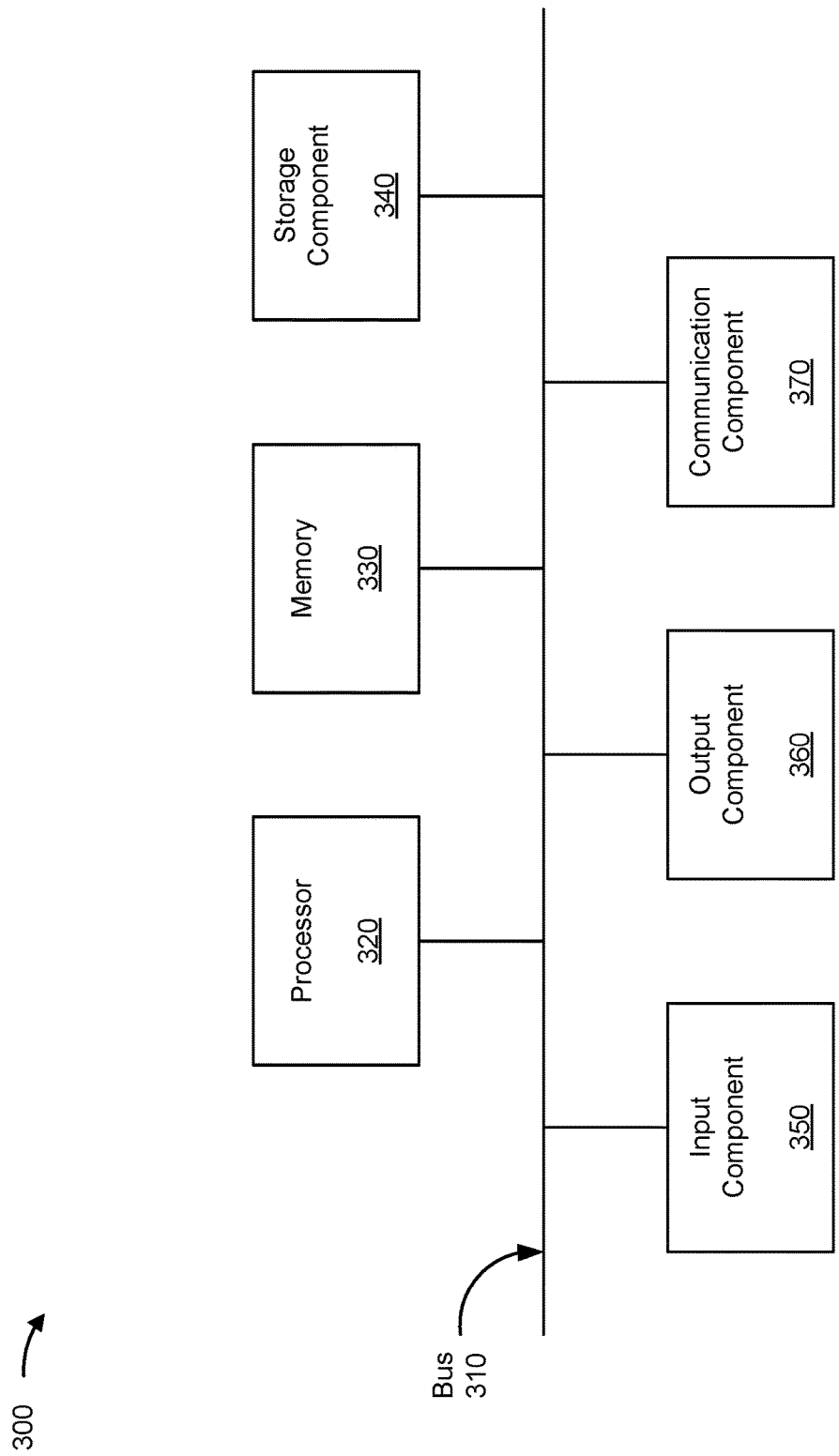
FIG. 3 is a diagram of example components of one or more devices of FIG. 2.

FIG. 3 is a diagram of example components of a device 300, which may correspond to ride control system 105, ride control simulation system 110, and/or client device 120. In some implementations, passenger vehicle 130, ride control system 105, ride control simulation system 110, and/or client device 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
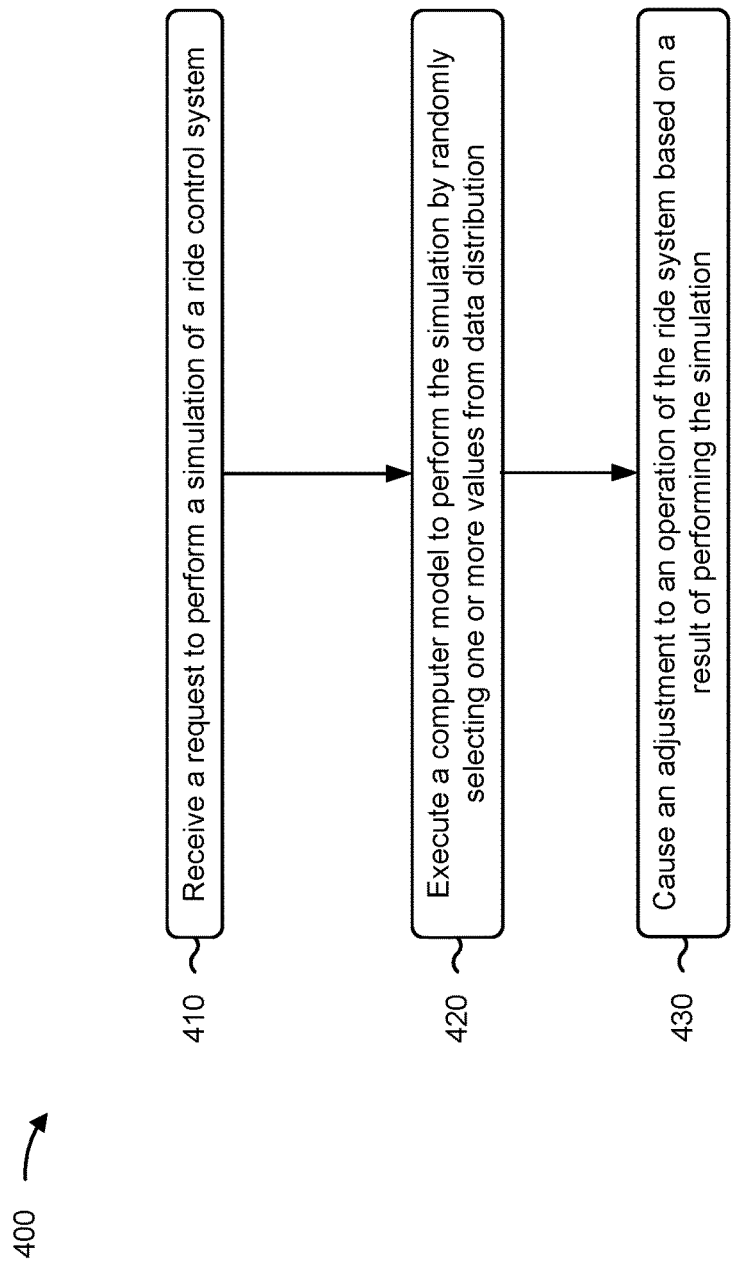
FIG. 4 is a flowchart of an example process relating to simulating an operation of a control system of a ride system based on stochastic events.

FIG. 4 is a flowchart of an example process 400 associated with simulating an operation of a control system of a ride system. In some implementations, one or more process blocks of FIG. 4 may be performed by a ride control simulation system (e.g., ride control simulation system 110). In some implementations, one or more process blocks of FIG. 4 may be performed by another device or a group of devices separate from or including the ride control simulation system, such as a ride control system (e.g., ride control system 104) and/or a ride control simulation system (e.g., ride control simulation system 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a request to simulate a ride control system controlling a movement of a passenger vehicle on a ride system (block 410). For example, the ride control simulation system may receive a request to simulate a ride control system controlling a movement of a passenger vehicle on a ride system, wherein the request includes vehicle information regarding the passenger vehicle and ride system information regarding the ride system, as described above. In some implementations, the request includes vehicle information regarding the passenger vehicle and ride system information regarding the ride system.

As further shown in FIG. 4, process 400 may include executing, based on the request, a computer model to simulate the ride control system controlling the movement of the passenger vehicle on the ride system (block 420). For example, the ride control simulation system may execute, based on the request, a computer model to simulate the ride control system controlling the movement of the passenger vehicle on the ride system, wherein executing the computer model comprises: randomly selecting a first value from a first data distribution regarding times associated with loading passengers onto passenger vehicles, causing an adjustment to an operation of the ride system based on a result of executing the computer model, as described above. In some implementations, executing the computer model comprises: randomly selecting a first value from a first data distribution regarding times associated with loading passengers onto passenger vehicles, causing an adjustment to an operation of the ride system based on a result of executing the computer model.

In some implementations, executing the computer model to perform the simulation further comprises randomly selecting demographics information regarding the passengers from a fourth data distribution regarding demographics of different passengers, and determining a mass of the passengers based on the demographics information, wherein the computer model is executed using the mass of the passengers as an additional input.

In some implementations, executing the computer model comprises randomly selecting historical information regarding the ride system, wherein the historical information includes historical weather information that identifies a weather condition, and determining a measure of friction associated with the movement of the passenger vehicle based on the historical weather condition, wherein the computer model is executed using the historical weather information and friction information identifying the measure of friction as additional inputs.

In some implementations, the first data distribution, the second data distribution, and the third data distribution comprise one or more normal data distributions.

In some implementations, the first data distribution, the second data distribution, and the third data distribution comprise one or more non-normal data distributions.

In some implementations, the first value, the second value, and the third value are randomly selected to simulate one or more stochastic events occurring between a stopping time of the passenger vehicle and a dispatch time of the passenger vehicle, and wherein causing the adjustment to the operation of the ride system comprises causing the dispatch time or the stopping time to be adjusted based on a result of executing the computer model.

In some implementations, executing the computer model further comprises executing the computer model as part of batch processing to perform a plurality of computer simulations of the ride control system controlling the movement of the passenger vehicle on the ride system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a ride control simulation system, the method comprising:
   receiving a request to simulate a ride control system controlling a movement of a passenger vehicle on a ride system,
      wherein the request includes vehicle information regarding the passenger vehicle and ride system information regarding the ride system;
   executing, based on the request, a computer model to simulate the ride control system controlling the movement of the passenger vehicle on the ride system,
   wherein executing the computer model comprises:
      randomly selecting a first value from a first data distribution regarding times associated with loading passengers onto passenger vehicles,
      randomly selecting a second value from a second data distribution regarding times associated with performing safety checks for the passengers, and
      randomly selecting a third value from a third data distribution regarding times associated with dispatching the passengers after the safety checks,
         wherein the computer model is executed using the first value, the second value, and the third value as inputs; and
   causing an adjustment to an operation of the ride system based on a result of executing the computer model.

2. The method of claim 1, wherein executing the computer model to perform the simulation further comprises:
   randomly selecting demographics information regarding the passengers from a fourth data distribution regarding demographics of different passengers; and
   determining a mass of the passengers based on the demographics information,
      wherein the computer model is executed using the mass of the passengers as an additional input.

3. The method of claim 1, wherein executing the computer model comprises:
   randomly selecting historical information regarding the ride system,
      wherein the historical information includes historical weather information that identifies a weather condition; and
   determining a measure of friction associated with the movement of the passenger vehicle based on the historical weather condition,
      wherein the computer model is executed using the historical weather information and friction information identifying the measure of friction as additional inputs.

4. The method of claim 1, wherein the first data distribution, the second data distribution, and the third data distribution comprise one or more normal data distributions.

5. The method of claim 1, wherein the first data distribution, the second data distribution, and the third data distribution comprise one or more non-normal data distributions.

6. The method of claim 1, wherein the first value, the second value, and the third value are randomly selected to simulate one or more stochastic events occurring between a stopping time of the passenger vehicle and a dispatch time of the passenger vehicle, and
   wherein causing the adjustment to the operation of the ride system comprises:
      causing the dispatch time or the stopping time to be adjusted based on a result of executing the computer model.

7. The method of claim 1, wherein executing the computer model further comprises:
   executing the computer model as part of batch processing to perform a plurality of computer simulations of the ride control system controlling the movement of the passenger vehicle on the ride system.

8. A system, comprising:
   a ride control system configured to control a movement of a passenger vehicle on a ride system; and
   a ride control simulation system configured to:
      receive a request to simulate the ride control system controlling the movement of the passenger vehicle on the ride system,
         wherein the request includes vehicle information regarding the passenger vehicle and ride system information regarding the ride system;
      executing, based on the request, a computer model to simulate the ride control system controlling the movement of the passenger vehicle on the ride system,
      wherein, to execute the computer model, the ride control simulation system is configured to:
         randomly select one or more values from a plurality of data distributions,
            wherein the one or more values are randomly selected to simulate one or more stochastic events occurring between a stopping time of the passenger vehicle and a dispatch time of the passenger vehicle, and
            wherein the computer model is executed using the one or more values as one or more inputs; and
      cause an adjustment to an operation of the ride system based on a result of executing the computer model.

9. The system of claim 8, wherein, to execute the computer model, the ride control simulation system is further configured to:
   determine that the passenger vehicle is not in motion; and
   determine that the passenger vehicle is ready for passengers to be loaded after determining that the passenger vehicle is not in motion,
      wherein the one or more values are randomly selected based on determining that the passenger vehicle is ready for the passengers to be loaded.

10. The system of claim 8, wherein, to execute the computer model to perform the simulation, the ride control simulation system is further configured to:
   execute the computer model as part of batch processing to perform a plurality of simulations of the ride control system controlling the movement of the passenger vehicle on the ride system.

11. The system of claim 10,
   wherein the one or more values are one or more first values for a first computer simulation of the plurality of computer simulations, and
   wherein, to perform batch processing, the ride control simulation system is further configured to:
      randomly select one or more second values from the plurality of data distributions,
         wherein the one or more second values are different than the one or more first values, and
      execute the computer model to perform a second computer simulation of the plurality of computer simulations,
         wherein the computer model is executed using the one or more second values as one or more inputs.

12. The system of claim 8, wherein, to execute the computer model, the ride control simulation system is further configured to:
   randomly select demographics information regarding passengers of the passenger vehicle; and
   determine a mass of the passengers based on the demographics information,
      wherein the computer model is executed using the mass of the passengers as an additional input.

13. The system of claim 8, wherein, to execute the computer model, the ride control simulation system is further configured to:
   randomly select historical information regarding the ride system,
      wherein the historical information identifies at least one of a weather condition or an environmental condition, and
      wherein the computer model is executed using the historical weather information as an additional input.

14. The system of claim 8, wherein, to randomly select the one or more values, the ride control simulation system is further configured to:
   determine a type of safety mechanism for the passenger vehicle from a plurality of types of safety mechanisms;
   determine a particular data distribution from a plurality of data distributions associated with the plurality of types of safety mechanisms; and
   randomly select a value from the particular data distribution.

15. A non-transitory computer-readable medium storing a set of instructions, the set of instructions comprising:
   one or more instructions that, when executed by one or more processors of a device, cause the device to:
      receive a request to simulate a ride control system controlling a movement of a passenger vehicle on a ride system,
         wherein the request includes vehicle information regarding the passenger vehicle and ride system information regarding a ride system;
      executing, based on the request, a computer model to simulate a ride control system controlling the movement of the passenger vehicle on the ride system,
      wherein the one or more instructions, that cause the device to execute the computer model, cause the device to:
         randomly select one or more values from a plurality of data distributions,
            wherein the one or more values are randomly selected to simulate one or more stochastic events occurring between a stopping time of the passenger vehicle and a dispatch time of the passenger vehicle, and
            wherein the computer model is executed using the one or more values as one or more inputs; and
         perform an action based on a result of executing the computer model.

16. The non-transitory computer-readable medium of claim 15, wherein the one or more instructions, that cause the device to execute the computer model, cause the device to:
   randomly select demographics information regarding passengers of the passenger vehicle from a data distribution regarding demographics of different groups of passengers; and
   determine a mass of the passengers based on the demographics information,
      wherein the computer model is executed using the mass of the passengers as an additional input.

17. The non-transitory computer-readable medium of claim 15, wherein the one or more instructions, that cause the device to execute the computer model, cause the device to:
   randomly select historical information regarding the ride system,
      wherein the historical information includes historical weather information that identifies a weather condition, and
      wherein the computer model is executed using the historical weather information.

18. The non-transitory computer-readable medium of claim 15, wherein the one or more instructions, that cause the device to execute the computer model, cause the device to:
   determine that the passenger vehicle is not in motion; and
   determine that the passenger vehicle is ready for passengers to be loaded after determining the passenger vehicle is not in motion,
      wherein the one or more values are randomly selected based on determining that the passenger vehicle is ready for the passengers to be loaded.

19. The non-transitory computer-readable medium of claim 15, wherein the one or more instructions, that cause the device to execute the computer model, cause the device to:
   execute the computer model as part of batch processing to perform a plurality of computer simulations of the ride control system controlling the movement of the passenger vehicle on the ride system.

20. The non-transitory computer-readable medium of claim 15, wherein the one or more instructions, that cause the device to perform the action, cause the device to:
cause the dispatch time or the stopping time to be adjusted based on a result of executing the computer model.

* * * * *